United States Patent [19]

Fazzari et al.

[11] Patent Number: 5,659,624
[45] Date of Patent: Aug. 19, 1997

[54] HIGH SPEED MASS FLOW FOOD SORTING APPARTUS FOR OPTICALLY INSPECTING AND SORTING BULK FOOD PRODUCTS

[76] Inventors: Rodney J. Fazzari, 1230 Colonial Dr., College Place, Wash. 99324; Richard J. Hebel, 385 Catherine St.; Frank K. Skorina, 116 Stanton, both of Walla Walla, Wash. 99362

[21] Appl. No.: 522,944

[22] Filed: Sep. 1, 1995

[51] Int. Cl.⁶ ................................................. G06K 9/00
[52] U.S. Cl. ........................... 382/110; 382/156; 209/580
[58] Field of Search .................................. 382/110, 156, 382/165, 224, 141; 209/580, 581, 582; 348/91, 89

[56] References Cited

U.S. PATENT DOCUMENTS

| | | | |
|---|---|---|---|
| 4,319,269 | 3/1982 | Kajiura et al. | 358/106 |
| 4,520,702 | 6/1985 | Davis et al. | 83/71 |
| 4,576,482 | 3/1986 | Pryor | 356/376 |
| 4,581,632 | 4/1986 | Davis et al. | 358/106 |
| 4,738,175 | 4/1988 | Little et al. | 83/71 |
| 4,829,380 | 5/1989 | Iadipaolo | 358/166 |
| 4,853,533 | 8/1989 | Little et al. | 250/223 |
| 4,906,099 | 3/1990 | Casasent | 356/394 |
| 5,060,290 | 10/1991 | Kelly et al. | 382/18 |
| 5,119,205 | 6/1992 | Lemelson | 358/93 |
| 5,151,822 | 9/1992 | Hekker et al. | 359/559 |
| 5,283,641 | 2/1994 | Lemelson | 248/92 |
| 5,318,173 | 6/1994 | Datari | 209/580 |
| 5,335,293 | 8/1994 | Vannelli et al. | 382/17 |
| 5,526,437 | 6/1996 | West | 348/91 |

*Primary Examiner*—Leo Boudreau
*Assistant Examiner*—Phuoc Tran
*Attorney, Agent, or Firm*—Wells, St. John, Roberts, Gregory & Matkin, P.S.

[57] ABSTRACT

A high speed mass flow food sorting apparatus and method comprises a product conveyor for receiving and conveying a laterally-distributed stream of bulk food articles past a product diverter. A camera is positioned to view the stream of food articles upstream of a product diverter. A sorting system downstream of the camera including a product diverter is configured to divert undesirable product in response to optically detected undesirable characteristics pursuant to an automated control system. The automated control system connects to the optical inspection system and the sorting system and includes an operator control console having a display and a screen-adjustable graphical slider usable for altering sorting characteristics corresponding to an undesirable optically detected characteristic so as to direct sorting of the undesirable food article during processing. Preferably, the operator control console displays a graphical user interface via a computer on which the control system is implemented and includes a software application pack specifically configured for processing a particular type of food article having corresponding desirable features, at least one having a corresponding screen-adjustable scaling image.

26 Claims, 11 Drawing Sheets

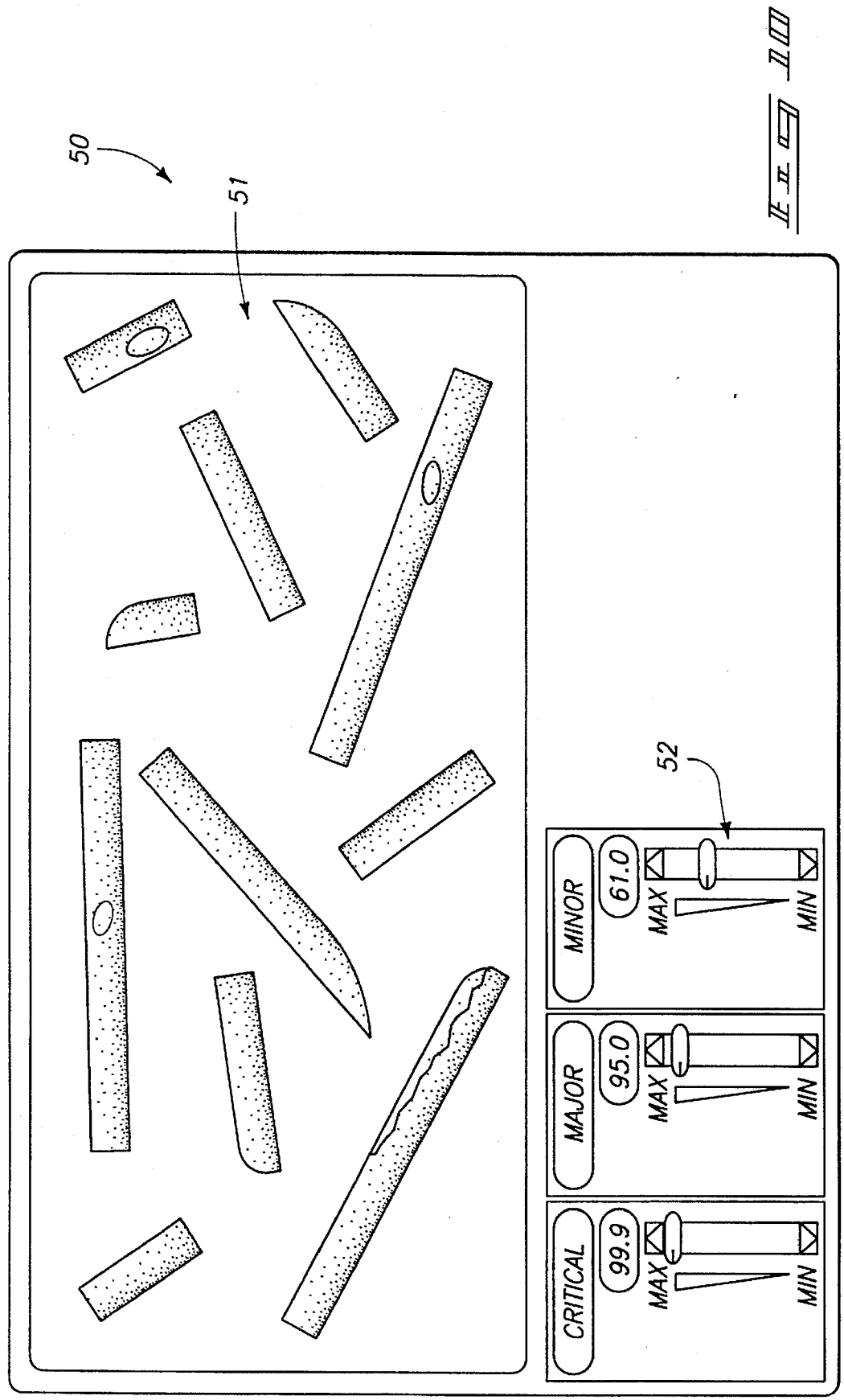

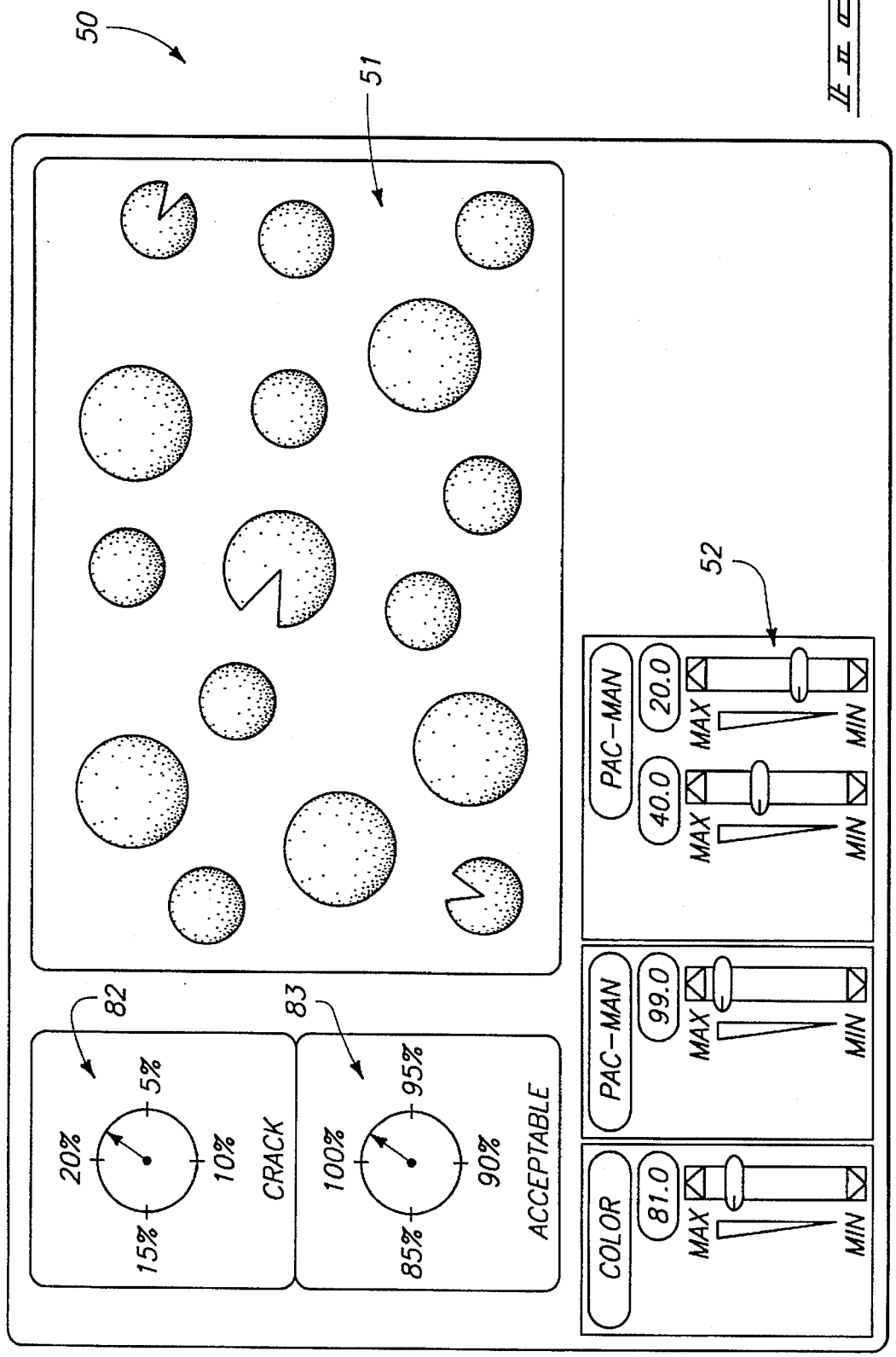

HIGH SPEED MASS FLOW FOOD SORTING APPARTUS FOR OPTICALLY INSPECTING AND SORTING BULK FOOD PRODUCTS

TECHNICAL FIELD

This invention relates to methods and apparatus for inspecting food products and other products or items whose quality can be visually ascertained; for sorting such products with automated optical sorters; and for setting sorting parameters for a food sorting machine having an application-specific graphical user interface.

BACKGROUND OF THE INVENTION

In manufacturing and processing environments, it is common to optically inspect and sort individual moving articles with automatic optical inspection equipment. Particularly, where high speed belt conveyors move a mass flow of bulk products or articles past an inspection station, the optical inspection equipment can determine optical properties of the articles, and undesirable articles can be separated from the flow with sorting equipment. In many cases, a general sorting system incorporates some form of basic image-processing capabilities. One area where it is especially important to optically inspect and sort a moving stream of bulk products is in the food-processing industry where there is a need to automatically sort food products by visual or optical inspection of the food products to identify food articles having specified desirable or undesirable visual characteristics. Examples include fruits, vegetables, and nuts. Other areas requiring a similar sorting of bulk products or articles includes the sorting of naturally occurring products such as wood chips and aggregate, of manufactured products such as fasteners and formed parts, and of meat products, particularly of quartered or cubed poultry or beef products.

One very effective optical inspection and sorting system is described in U.S. Pat. No. 4,581,632 granted in 1986 (reissued on Sep. 25, 1990 as RE 33,357), assigned to Key Technology, Inc. of Walla Walla, Wash. In such systems, defective products are detected and removed based upon their optical characteristics. Key Technology manufactures and sells a variety of optical-based sorting systems, including systems utilizing color-inspection cameras. Typically, a high speed conveyor belt conveys a wide swath of food articles past an automatic optical-inspection station. An inspection station is provided relative to a random lateral distribution of individual food articles conveyed by the belt. The inspection station identifies undesirable or defective articles and removes them from the product flow.

Technological advances and increasing market demands are resulting in the development of sophisticated sorting machines offering high-resolution true-color Red, Green, and Blue (RGB) cameras and powerful image-processing engines of ever-increasing complexity. This has resulted in concomitant increases in complexity and a corresponding increase in the demands placed on an operator attempting to set up and calibrate a machine for a particular sorting task.

The evolving complexity of sorting systems is further compounded by the fact that most sorting systems, particularly those utilized in the food-processing industry, employ machine operators who have little or no image-processing or machine-vision expertise, and who very often are illiterate. It becomes a daunting challenge for one of these operators to attempt to use any form of general sorting system, let alone a state-of-the-art sorting system.

To lower manufacturing and support costs, sorter-manufacturing companies want to offer a single, generic, do-everything sorting machine that can process a nearly unlimited variety of products. Thus, food-processing plants have not been able to purchase highly specialized sorting machines that are customized or uniquely configured for their specific products. They have typically purchased one of the available generic sorting machines and then did their best to tailor it for their application. Thus, the burden of machine configuration, initialization, and control has been placed squarely on the operator. As newer and more complex sorting machines become available, this burden will be too much for most operators to handle, thereby reducing sorting performance to a level that is not optimal and far below the potential possessed by these newer machines.

Increasingly complex sorting machines generate two parallel needs. The first need is a method for operating such a machine that hides the complexity of the machine from operators while at the same time provides a straightforward way for them to fully utilize the potential of the machine. The second need is an easy-to-use method for allowing an operator to custom-configure the machine for his particular product. This might include tailoring the machine's operator interface to use terms and jargon that are specific to the product being sorted and thus familiar to machine operators as well.

Adding significant complexity to the latest sorting machines are the image-processing capabilities required to properly identify defective pieces based on their color, shape, and/or size, or the locations of defective areas on them. An example of such image-processing capabilities is described in U.S. Pat. No. 5,335,293, also assigned to Key Technology, Inc., hereinafter incorporated by reference. This patent describes an automated quality inspection station for inspecting food products whose quality can be visually ascertained, for classifying component areas of the products being inspected, and for setting process parameters of in-line processing equipment based on the classifications. Video image scans are captured with a frame grabber after which a processor analyzes data stored in the frame to extract color-, shape-, and/or size-related information. In this manner, video images are first characterized based on classification of color values established in a sample calibration pursuant to a determination of the probability of any single color value occurring in a single component type of defect versus any other type of component defect. Then, contiguous groups of similarly characterized pixels are analyzed for shape- and/or size-related information using multi-stage morphological filters and feature-extraction algorithms. Based on this analysis, each individual product piece is classified in either the acceptable category or one of possibly several defective categories.

With the color-characterization technique described above, an operator first identifies samples of pixels for each defect type, then reference curves are automatically created from these samples, and then the operator specifies and adjusts probability scaling factors which are used to scale these reference curves. Each curve represents the probability of a single color value occurring in any single component defect type relative to other defect types. However, correct operation of this system depends significantly upon operator initialization and adjustments. Additionally, a system may have the potential for recognizing millions of different colors, making this aspect of system initialization somewhat complex for an operator.

Fine-tuning of a sorter with the image-processing capabilities described above requires some degree of manual adjustment of a plurality of interacting sorting parameters. Therefore, in order to correctly configure and initialize an optical sorting system, an experienced and capable operator becomes a requirement. Since such an operator is often not available, optimum sorting results are frequently not obtained. Furthermore, when attempting to produce a single machine capable of being reconfigured for a variety of products, additional ambiguities often arise requiring substantially greater configuration and initialization time and complexity at the operator interface. Many of these ambiguities arise even among the characteristics of a common product. For example, when sorting peas with a sorting device, the setup of the machine can become overwhelming because of the variable nature of the incoming product, data-processing constraints, imperfections in obtaining the data upon which decisions are based, and the imprecise manner in which defective articles are separated from the product stream in many sorting devices. These machines often involve trade-offs and compromises for an operator even when attempting to determine optimum operating settings. Hence, the operator's job becomes overly complex not only for setting up sorts between different products, but also for setting up accurate sorts for a particular product.

Therefore, in light of all of the recent developments in sorting systems, there is a need to greatly simplify the operator interface requirements for configuration, initialization, and operation of sorting machines for specific products. Even for sorting applications requiring only the most basic image-processing capabilities, this need is evident. For those applications requiring more advanced image-processing algorithms, this need is magnified. A simple operator interface on a sorting machine should harness the power and sophistication of the sorting machine while protecting the operator from having to understand its inner complexities.

The invention described below provides a method and apparatus for facilitating the configuration and initialization involved in customizing a highly complex sorting machine for specific products and simplifying the operator interface of the sorting machine to hide complexity. In addition, the methods described below adapt themselves to simple adjustments of a plethora of complex sorting parameters when sorting specific products.

BRIEF DESCRIPTION OF THE DRAWINGS

Preferred embodiments of the invention are described below with reference to the accompanying drawings, which are briefly described below.

FIGS. 8–11 depict various exemplary touch pad screen displays realized with an application pack of this invention including respective graphical sliders for adjusting corresponding sorting parameters and respective status displays for providing sorting statistics.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
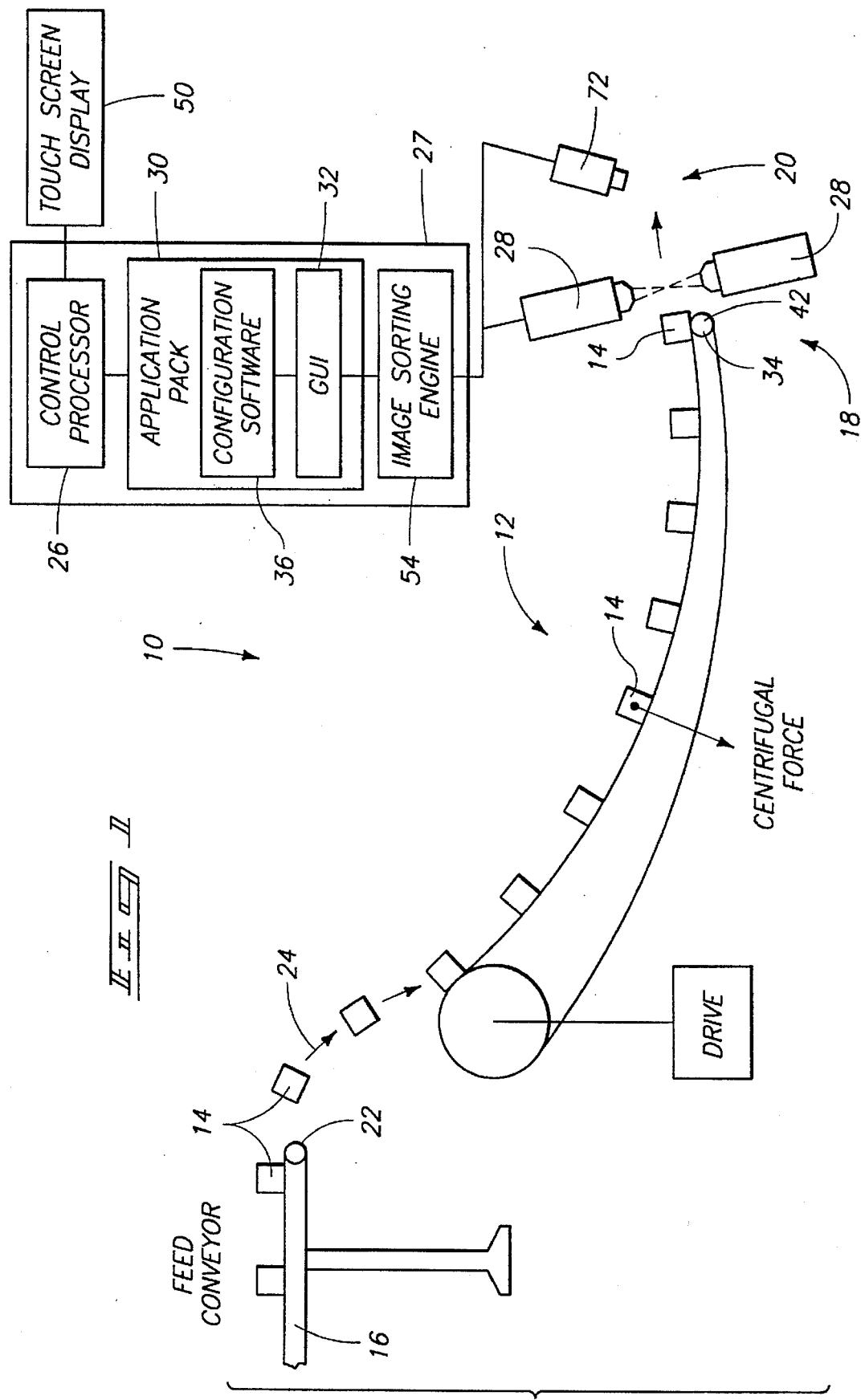
FIG. 1 is a side view of a high-speed continuous-length belt conveyor delivering articles in a stabilized condition at high speeds to an optical inspection and sorting station in accordance with the invention.

A preferred embodiment of a high-speed mass-flow food-sorting apparatus of this invention is illustrated in FIG. 1 and is generally designated with numeral 10. A conveyor 12 is designed to receive bulk articles 14 fed in a wide swath from a low-velocity bulk feeder 16 (such as a feeder shaker), stabilize the articles using centrifugal force, and convey the articles individually at a high velocity past an optical-inspection station 18 and a sorting station 20.

Bulk feeder 16 is constructed and arranged to shake articles 14 so as to spread them out both laterally and longitudinally into a single layer having a wide swath. A discharge end 22 on the feeder discharges the articles in a wide swath from the feeder into free flight toward the conveyor 12 at a relatively low velocity. The articles 14 maintain a free flight trajectory 24 as they are discharged from the feeder to the conveyor. An example of a sorting apparatus having the aforementioned construction of a bulk feeder 16 and conveyor 12 in combination with an inspection station and a sorting station is described in a pending U.S. patent application entitled "Bulk Product Stabilizing Belt Conveyor", filed Apr. 20, 1995, Ser. No. 08/426,893 assigned to Key Technology, Inc. This pending application is incorporated herein by reference.

In order to facilitate setup and ease-of-use by an operator, improvements have been made to the inspection station 18 and sorting station 20. A personal computer 27 implements a control processor 26 and memory-based software to operate an array of imaging cameras 28 and an array of product diverters 72, or other mechanisms for removal of product from product flow, including knives. Additionally, a higher-layer of software called an application pack 30 which includes a graphical user interface 32 and configuration software 36 is implemented on the personal computer. The application pack 30 allows an operator to easily configure, initialize, and control inspection and sorting operations carried out by the cameras and product diverters for a specific product such as peas, corn, beans, etc. As shown in FIG. 1, the inspection station 18 is formed from the personal computer 27, including the application pack 30, and the cameras 28. Similarly, the sorting station 20 is formed from the personal computer 27, including the application pack 30, and the product diverters 72.

For purposes of this disclosure and the accompanying claims, sorting shall refer to arranging items according to class, kind or size; classifying; separating items or portions of items one from the other, including cutting portions or segments of an item from a remaining body such as with a cutting wheel. For example, sorting shall include machinery configured to implement automated defect removal (ADR™, a registered trademark of Key Technology, Inc.), as well as other sorting, cutting and feature separating machinery and processes. Generally, sorting shall refer to a separation of product based on differentiable visual characteristics, including the more limited sorting of "undesirable" characteristics from a product being sorted.

Figure 2:
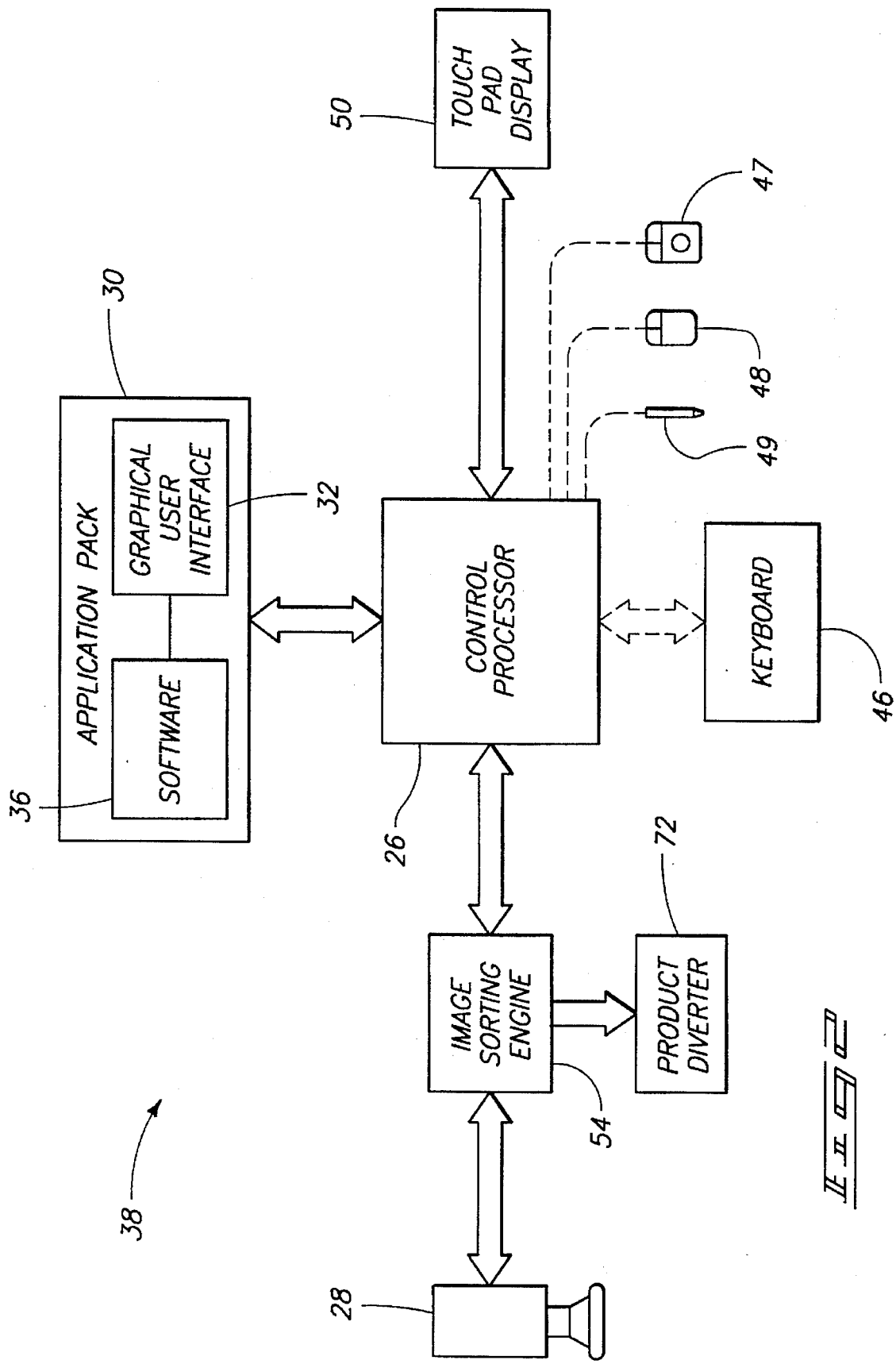
FIG. 2 is a schematic block diagram of a control system which is part of the optical-inspection and sorting station shown in FIG. 1.

Preferably, the graphical user interface (GUI) 32 of the application pack 30 is implemented in software as shown in FIG. 2. In order to configure the sorter 10 for sorting a particular product, the configuration software 36 and GUI 32 are loaded into the memory of the personal computer 27. Preferably, the configuration software 36, when executed by the control processor 26, facilitates the configuration, setup, and initialization of the sorting apparatus for a particular product. An image sorting engine 54, provided in the form of hardware and software, is configured and initialized by the configuration software 36 to enable the sorter to classify colors, isolate desired properties, compute features, and classify objects for any specific sorting application. Preferably, the GUI 32, when executed by the control processor 26, provides a graphical interface to the sorting machine and uses terms specific to the product being sorted and familiar to the operator. Preferably, a touch pad display 50 displays a series of graphical sliders 52, an image-display window 51, and one or more status displays 80–83 as illustrated in FIGS. 8–11. Preferably, a given slider can be easily adjusted by an operator to alter one or more sorting parameters which define differentiable visual characteristics on an article being sorted. In addition, the status displays 80–83 will preferably indicate various sorting statistics such as percentage of each class detected, percentage of each class removed, etc. Preferably, visual characteristics are color-related, which are implemented with attributes; shape-related, which are implemented with properties; and/or size or feature location related including defect, which are implemented with features and feature thresholds.

Figure 4:
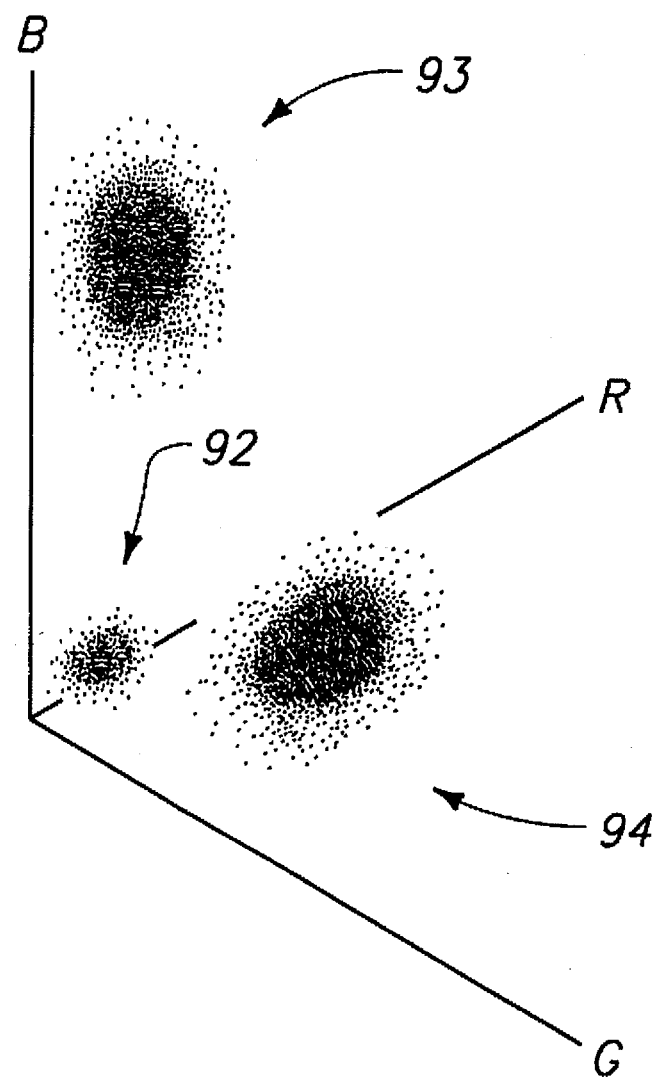
FIG. 4 is a schematic illustration of an exemplary membership classification in RGB space used for initializing the color classifier 64 in FIG. 3.

Preferably, as shown in FIG. 4, an attribute can be defined as a collection of points in red-green-blue space (RGB) space, which can be considered the same color for the sorting application at hand. Alternatively, an intensity independent color space such as HSI or LAB can be used. For example, the color(s) that an operator considers "rot" on a green bean may include thousands of points in RGB space. This idea is illustrated by the rot color cloud 92 in FIG. 4. Similarly, the color(s) that an operator considers "product flesh" (i.e. acceptable) on a green bean may include the thousands of points in the product-flesh color cloud 94. And the color(s) that a sorter "sees" in the absence of any product, that is, the background color(s), may include the thousands of points in the "background" color cloud 93.

Sorting applications can have a varying number of attributes and each attribute will have a corresponding color cloud in RGB-space. Once all attributes have been defined for a given application and corresponding color clouds have been created, the color classifier 64 shown in both of FIGS. 3 and 5 will classify each 24-bit RGB pixel from color image 91 into exactly one of these attributes. The color classifier does this by creating a binary image, or "attribute image," for each attribute from the 24-bit color image 91 that the color classifier processes. An attribute image is a single-bit "duplicate" of the 24-bit color image 91. An attribute image for a given attribute contains single-bit values which are enabled, i.e. their values are set equal to "1", only at those locations in the attribute image which correspond to locations in the original 24-bit color image containing RGB values that map inside the corresponding color cloud in RGB space.

Figure 3:
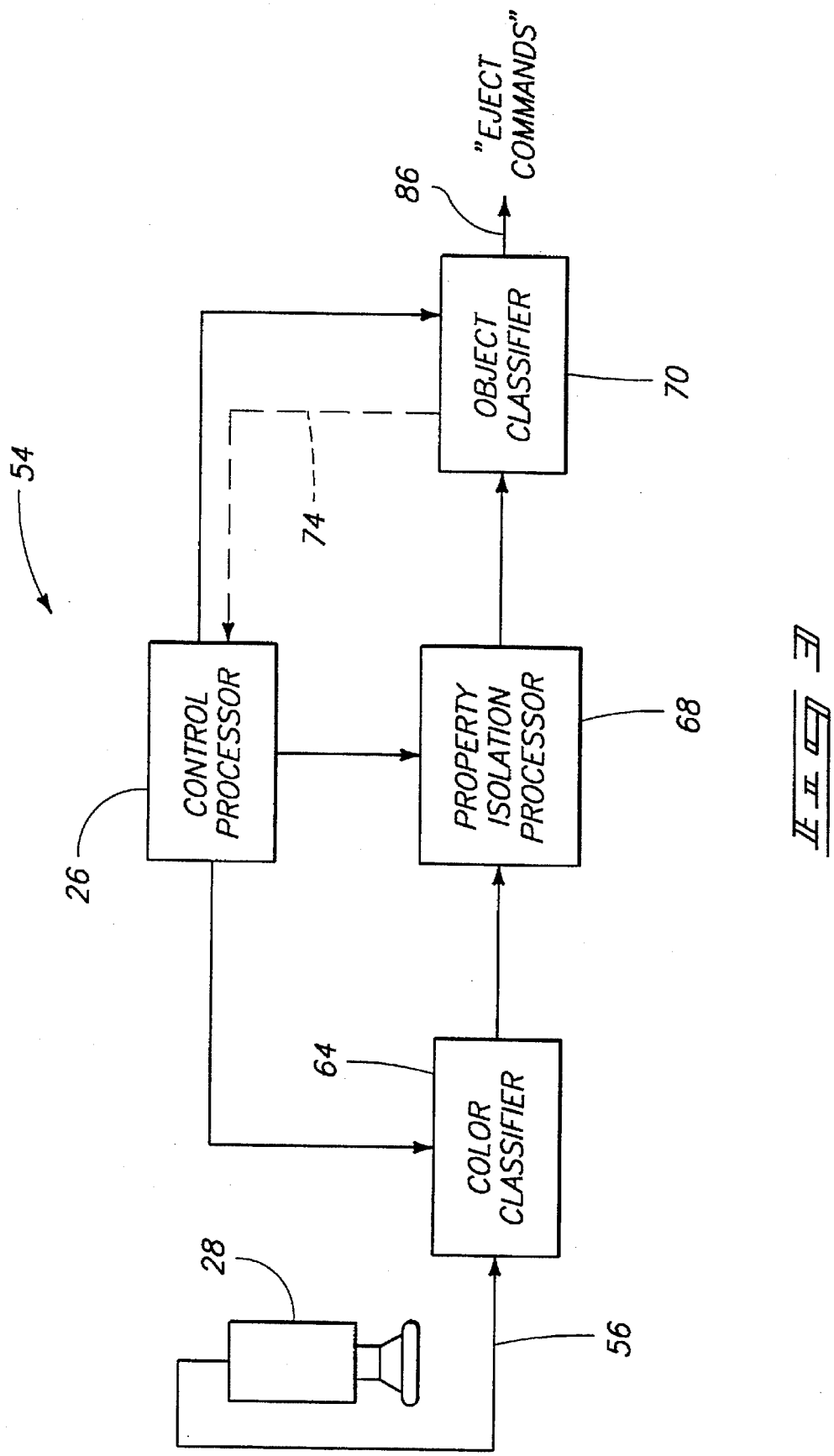
FIG. 3 is a schematic block diagram of the image sorting engine shown in FIG. 2.

The attribute images created by color classifier 64 contain "blobs", also referred to as "objects", or spatially contiguous groups of pixels which need further processing by the property isolation process 68 in FIG. 3. This processing includes the isolation of object properties into separate binary images, or "property images." A property can be defined as a collection of pixels on an object that characterize some aspect of the object's shape. For example, the pixels that are on an object's perimeter are a property of that object; the pixels that are on an arbitrarily thin part of an object are a property of that object; the pixels that surround a hole in an object are a property of that object; the pixels that are on an object's skeleton (which is the stick figure representation of the object) are a property of that object. Properties that can be isolated from an object are also objects in and of themselves in that they also are spatially contiguous groups of pixels. A property image for a given attribute image contains single-bit values which are enabled (i.e.=1) only at those locations in the original attribute image containing pixels that satisfy some "property criterion" such as outer perimeter, thin, perimeter of a hole, skeleton, etc. as described above.

Attribute and property images created by color classifier 64 and property isolation processor 68 contain objects of spatially contiguous groups of pixels that need still further processing by the object classifier 70. This processing results in the computation and comparison of object features and feature combinations. A feature can be defined as a descriptor of shape orientation for an object and/or an indicator of object size. Examples of shape-orientation features are bounding box, bounding-box height, bounding-box width, bounding-box area, bounding-box area ratio, minimum radius, maximum radius, minimum radius angle, maximum radius angle, radius ratio, etc. Examples of size-indicator features are length, width, area, perimeter, etc.. (Commonly understood definitions for the above-listed features are described in "Digital Image Processing", by William K. Pratt, John Wiley & Sons, 1991, herein incorporated by reference). Examples of feature combinations are perimeter*perimeter/area, which is a measure of circularity, and center of gravity. Any feature calculated by the object classifier can then be combined with any other previously computed feature. In addition, a feature can be compared against a corresponding, and previously set feature threshold which defines acceptable values for that particular feature. The results of this comparison may indicate the existence of a defective object or other object intended for removal by product diverters 72.

FIG. 2 shows a control system 38 which forms a part of the inspection station 18 and sorting station 20. The control system 38 includes the control processor 26, the application pack 30, an image sorting engine 54, a plurality of imaging cameras 28, the touch pad display 50, and the product diverters 72. The control processor 26 is preferably a Pentium microprocessor produced by Intel. The application pack 30, image sorting engine 54, and touch pad display 50 provide the primary elements of this device. Namely, the addition of application pack 30 significantly simplifies configuration, initialization, and adjustments of the sorting apparatus 10 for specific sorting operations by providing product-specific configuration software 36 and product-specific graphical sliders 52 for altering one or more sorting parameters, or combination of parameters which define undesirable visual characteristics on an article being sorted.

FIG. 3 depicts in block-diagram form the processing pipeline provided by the sorting engine 54. The sorting engine is preferably implemented in a combination of hardware and software and includes an imaging camera 28, a color classifier 64, a property isolation processor 68, and an object classifier 70. Preferably, the classifiers 64 and 70 and processor 68 are implemented in hardware and software to produce eject commands 86 that direct the product diverters 72 to sort out undesirable product during a sorting operation. Alternatively, one or more of the above items can be implemented in pure software or pure hardware. For simplification purposes, a single-camera implementation is depicted in FIG. 3, although the control processor 26 is preferably configured to handle multiple cameras that are laterally spaced across the path of moving food articles during optical inspection and sort operations. Preferably, camera 28 is a line-scan true-color (24-bit RGB) video camera. Alternatively, any optical imaging device can be substituted for the camera, including a grey-scale video camera, a photocell device, a laser scanner, an ultraviolet camera, an infrared camera, a Magnetic Resonance Imaging (MRI) device, or a spectroscopic scanner.

Preferably, the sliders 52 provided by the application pack 30 can be adjusted via finger manipulation of the touch-pad display 50 by an operator or technician. Preferably, the sliders 52 are operated on the principle of resistive or capacitive changes produced at the display 50 by the adjacent placement of an operator's finger. For example, the sliders can be moved up and down in order to adjust a particular sorting parameter that alters either a desired sorting attribute, property, feature, or feature threshold, or a combination of one or more for a particular sort. Alternatively, a mouse 48, keyboard 46, track-ball 47, or light pen 49 can be provided to manipulate each "slider" when adjusting sorting parameters for a specific sorting operation.

Each "slider" is a graphical implementation of a mechanical slider that can be adjusted by way of the touch-pad display from an operator's finger-contact with the slider. In one form, the slider which is visibly displayed on the touch-pad display can be picked by touching the display with an operator's finger, then dragging the finger either up or down the display to pull the slider to a desired position. Preferably, the slider also includes a numerical display that indicates the value associated with the current slider position. Alternatively, a pair of directional arrows are provided at the top and bottom, respectively, such that an operator can touch either arrow in order to raise or lower the position of the slider. Implementation of a slider via a graphical user interface has already been realized in a number of commercially available software packages for personal computers. Personal computers typically have one or more CD drives that frequently include a sound board and speakers. One readily available graphical user interface includes a sound-equalizer that can be graphically displayed via the user-interface in order to adjust the frequency response characteristics of music that is played on the CD, through the sound board and speakers. Such a graphical user interface is analogous to mechanical analog sliders which in the past were provided on home stereo systems. Additionally, touch-pad displays have also been utilized in the food industry in order to provide a pointing device other than a mouse or light pen that is suitable for the harsh food-plant environment.

An operator can readily and easily configure and initialize the sorting apparatus 10 for a particular sorting operation simply by loading application pack 30, including GUI 32 and configuration software 36, into the memory of the personal computer 27. Preferably, image sorting engine 54 is completely configured and initialized by configuration software 36 according to the requirements of the particular sorting operation for which the application pack was created. Preferably, configuration software 36 and GUI 32 together form the application pack 30 which is provided on portable electronic media that is loaded into memory to become an integral part of the sorting apparatus 10. For example, one application pack could be provided to uniquely configure and initialize the sorter for peas, a second for green beans, a third for carrots, and a fourth for french fries. In this way, a manufacturer can produce one sophisticated generic sorter 10 that is easily reconfigured by an operator to sort a particular product simply by loading an application pack into memory.

FIG. 3 generally depicts a sorting machine with image sorting engine 54 implemented and control processor 26. The image sorting engine 54 incorporates many advanced image-processing capabilities that ordinarily would have to be initialized and controlled by a technician or "super operator" who is intimately familiar with the inner workings of the sorting apparatus 10. The application pack has all of the necessary configuration and initialization procedures built right in so that machine complexity is effectively hidden from the operator. Preferably, configuration and initialization steps which are incorporated into the application pack include the pre-definition of all of the following items: color definitions for selected attributes, proper sequences of morphological operations for isolating required properties, sets of features to compute and corresponding feature thresholds against which to compare them, and definitions for categories into which each piece can be classified.

Figure 5:
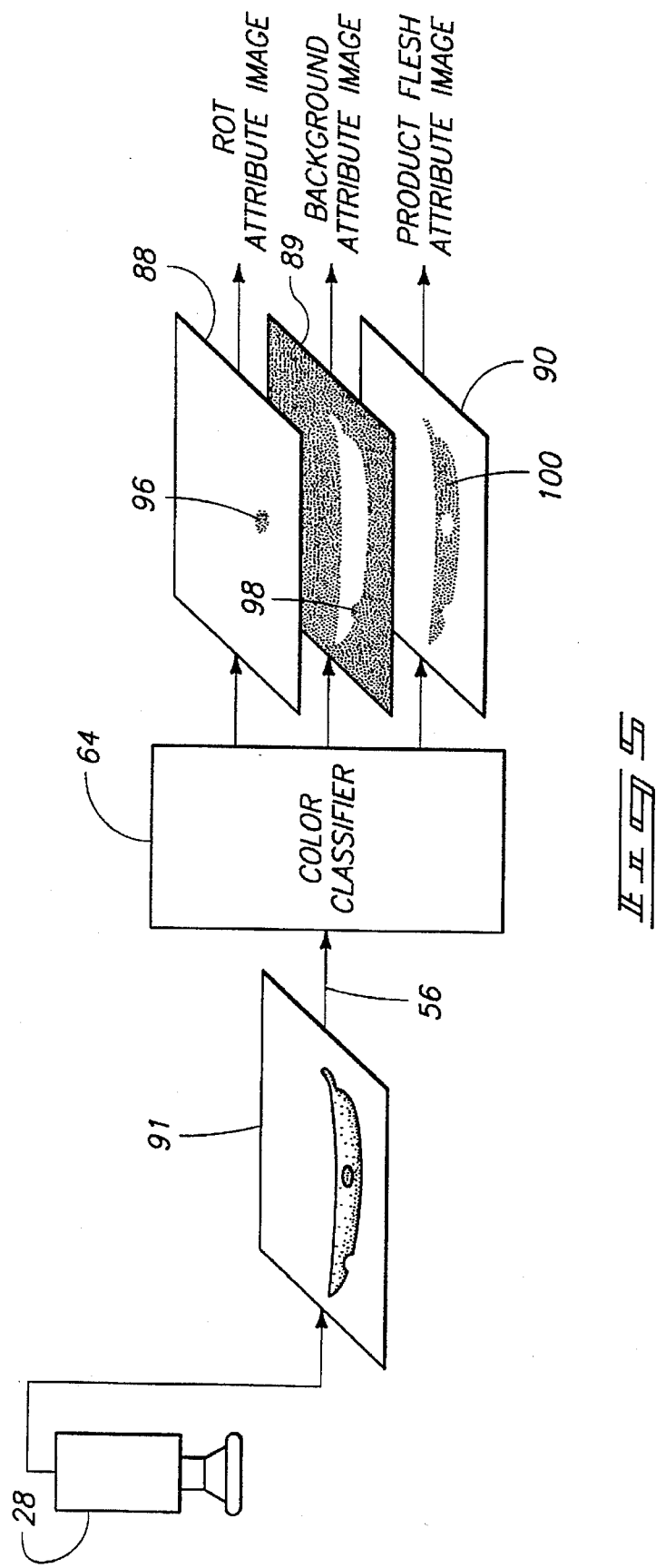
FIG. 5 is a schematic illustration of the implementation of the membership classification depicted in FIG. 4.

The color classifier 64 of FIG. 3 is preferably implemented in a combination of hardware and software. The color classifier preferably categorizes 24-bit color pixels into one of several pre-defined binary attribute images. For example, as shown in FIG. 5, a stream of pixel data 56 representing a color image 91 of a scanned bean enters the color classifier 64. It then categorizes each one of these pixels into the correct binary attribute image according to the locations in RGB space at which the pixels' RGB values map as depicted in FIG. 4. Attribute images are shown in FIG. 5 for the attributes of rot 88, background 89, and product flesh 90. For example, the rot object 96 in the rot attribute image 88 indicates that the RGB values of the pixels in the corresponding locations in color image 91 map into the rot color cloud 92 in RGB space as depicted in FIG. 4.

In order to initialize a device such as color classifier 64 without the aid of application pack 30 of this invention, an operator typically must go through a series of steps. First he must specify the number of colors that are required for performing an effective sort for a particular sorting operation. These colors are then defined for the machine by the operator by identifying samples of 24-bit RGB values to include in each color definition. Upon defining all of the necessary colors, the definitions are then automatically converted to multidimensional mathematical functions which describe the definitions. At this stage, the color definitions are expanded and/or contracted by the operator who must input numerical scaling factors one-by-one for the corresponding mathematical functions. Typically, an operator working with a prior art device (having no application pack) described in U.S. Pat. No. 5,335,293, assigned to Key Technology, Inc., has to continuously adjust scaling factors until the 24-bit-RGB pixel values are correctly converted to the desired attributes.

In contrast, an application pack 30 for a specific product will have a pre-established set of colors each of which has been predefined and adjusted for optimal color classification. When loaded into memory by the operator, the configuration software 36 of application pack 30 will automatically configure the color classifier 64 according to the predefined colors. In addition, one or more graphical sliders 52 tied directly to numerical scaling factors described above may be provided by the GUI 32 of application pack 30 on touch-pad display 50. In this manner, the operator simply adjusts a slider 52 to robustify the color classification process when required, and the configuration software 36 will then make the appropriate changes in the color classifier 64. For example, the operator may want the sorter to eject more green-spotted product pieces. In this case, he simply adjusts a slider labelled perhaps "green spot" to increase the sorter's sensitivity to the colors characteristic of green spots and the configuration software 36 does the rest.

Property isolation processor 68 shown in FIG. 3 is preferably implemented in a combination of hardware and software, wherein one or more types of multi-stage morphological and logical functions are performed. Morphological functions can be defined as operations in which the spatial form or structure of an object(s) is modified or ascertained. Types of morphological functions include pixel stacker, skeletonizer, erosion, dilation, and concatenated erosion/dilation pairs called open and close operations. Commonly understood definitions for the above-listed functions are described in Pratt, supra. Preferably, the property isolation processor utilizes multi-stage morphological functions to isolate into binary property images those shape-related properties of interest from objects in binary attribute images. Examples of properties isolated with processor 68 include pixels on arbitrarily "thin" parts of objects, perimeter pixels of objects, perimeter pixels of holes in objects, pixels on an object's skeleton, as well as other form and/or structural characteristics that are derived by combining morphological and/or logical operations. As described earlier, properties are themselves objects because they are contiguous groups of pixels.

Configuring the property isolation processor 68 for a particular product poses a daunting challenge even for the extremely rare operator specifically trained in morphological image processing. This configuration involves the specification of binary bit-masks and structuring elements (common to morphological image processing) which are specific to the product to be sorted. In addition, the sequence of morphological functions to be applied in this multi-stage process must be configured into the property isolation processor.

Preferably, an application pack 30 for a specific product will have a pre-established set of binary bit-masks and structuring elements for the optimal isolation of the properties required for the product to be sorted. When loaded into memory by the operator, the configuration software 36 of application pack 30 will automatically configure the property isolation processor 68 according to the pre-established bit-masks and structuring elements. Furthermore, the configuration software 36 will properly specify the sequence of morphological functions to be applied in any multi-stage processing that is required. One or more graphical sliders 52 each of which control one or more aspects of the property isolation processor may be provided by the GUI 32 of application pack 30 on touch-pad display 50. In this manner, the operator simply adjusts a few sliders 52 to change the definition of the properties being isolated when required, and the configuration software 36 will then make the appropriate changes in the property isolation processor 68. For example, the operator may want the sorter to eject product pieces with thicker plant stalk attached to them. In this case, he simply adjusts the slider labelled "stalk" to increase the sorter's sensitivity to it, and the configuration software 36 will adjust appropriate morphological structuring elements to redefine "thin" and then reconfigure the property isolation processor to isolate pixels on thicker areas of product pieces.

Object classifier 70 of FIG. 3 is preferably implemented in a combination of hardware and software. The object classifier is preferably used to compute features and feature combinations and to compare these values against feature thresholds. Examples of features include bounding box, minimum radius, minimum radius angle, length, width, area, etc. Examples of feature combinations are circularity and center of gravity. The object classifier 70 is also preferably used to analyze feature locations on objects as some applications allow objects with defects in the middle, for example such as french fries, to pass through without being ejected to maintain a specific length distribution.

Preferably, the object classifier 70 first identifies as objects all spatially contiguous groups of pixels, i.e. blobs, in each binary attribute plane and each binary property plane. Then features and feature combinations appropriate for the particular articles being sorted are computed and compared against pre-established feature thresholds. The results of these comparisons affect which articles are classified as defective and which articles are ejected via eject commands 86. Note that the object classifier 70 can be configured to eject just enough of the pieces it has classified as defective so as to barely stay in grade, thereby increasing yield. Note also that the object classifier 70 supplies sorting statistics 74 to the control processor such as percentage of defects detected in incoming product stream, percentage of defects ejected, etc.

Configuring the object classifier 70 typically involves specifying which features and feature combinations to compute, which feature and/or feature combinations require feature thresholds, how to logically combine comparison results in preparation for classifying pieces, how to classify pieces as defects, how to decide which defective pieces to actually eject, which sorting statistics are interesting to the operator, and how these statistics shall be displayed.

An exemplary application pack 30 configured for a specific product will have a pre-established set of features and feature combinations to compute and a corresponding set of feature thresholds against which to compare results for defect and eject classification. When loaded into computer memory by the operator on the device of FIG. 1, the configuration software 36 of application pack 30 shown in FIG. 3 will automatically configure the object classifier 70 according to the pre-established feature set. One or more graphical sliders 52 which control some aspect of object classification may be provided by the GUI 32 of application pack 30 on touch-pad display 50 of FIGS. 8–11. In this manner, the operator simply adjusts a few sliders 52, corresponding to, and labeled with, the typical terms operators in that industry would use for those characteristics, to change the manner in which product pieces are classified or sorting statistics are reported, and the configuration software 36 will then make the appropriate changes in the object classifier 70. For example, the operator may want the sorter to eject fewer of the pieces it is classifying as rot defect because the current target grade allows more of these types of defects in the final product. In this case, he simply adjusts the slider labelled "rot" to decrease the sorter's sensitivity to it, and the configuration software 36 will adjust appropriate feature computations and/or comparisons in the object classifier to remove fewer of the product pieces which are being classified as rot defects.

Figure 9:
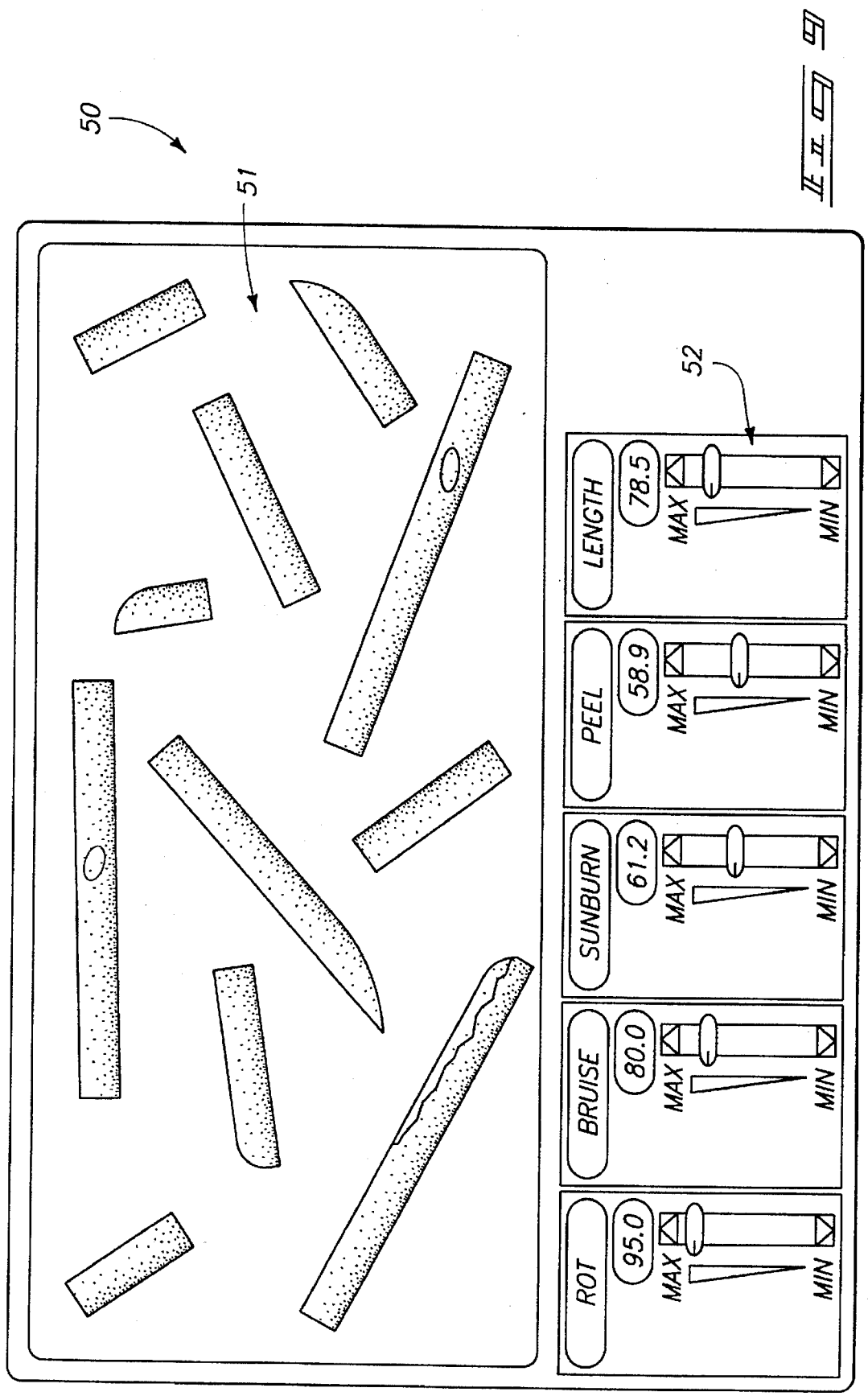

As indicated earlier and shown in FIG. 3, the object classifier 70 reports sorting statistics 74 to the control processor 26. The GUI 32 of application pack 30 can display these statistics in a variety of ways, depending on the product being sorted and the wishes of the operator. For example, status displays 80 and 81 of FIG. 6 indicate percentage of a defect called "bug bite" and percentage of defect-free beans, respectively. Another variation is depicted in FIG. 9 wherein the percentage of pieces with carrot cracks is indicated by status display 82 and the percentage of defect-free pieces is indicated by status display 83. In addition, the statistics reported by object classifier 70 can be used for automatic sorter parameter adjustments by statistical process control algorithms executing either on the control processor 26 or an external processor networked to the control processor 26.

Operators in food-processing plants know what they want their sorting machines to do. They just don't always know how to configure or articulate their desires to what are rapidly becoming highly sophisticated and complex machines. Application packs change all of that with product-specific configuration software 36 and GUI 32 providing graphical sliders which are carefully tailored to the desires of an operator for a particular product.

One alternative implementation to that depicted in FIG. 3 involves substitution of a statistical object classifier for the object classifier 70. The feedback information is delivered to the control processor 26 via the feedback loop 74 (indicated optionally in FIG. 3). One example of a statistical object classifier would involve implementing standard statistical pattern classification and scene analysis algorithms in order to characterize a population according to statistically observed features.

Another alternative implementation to that depicted in FIG. 3 involves substitution of a feature extractor 120, a neural network object classifier 121, and an eject processor 122 generally for the object classifier 70 of FIG. 3. One embodiment of this implementation of an application pack is depicted in FIG. 6 wherein the application pack supports the use of one or more forms of neural networks as the object classification mechanism.

Figure 6:
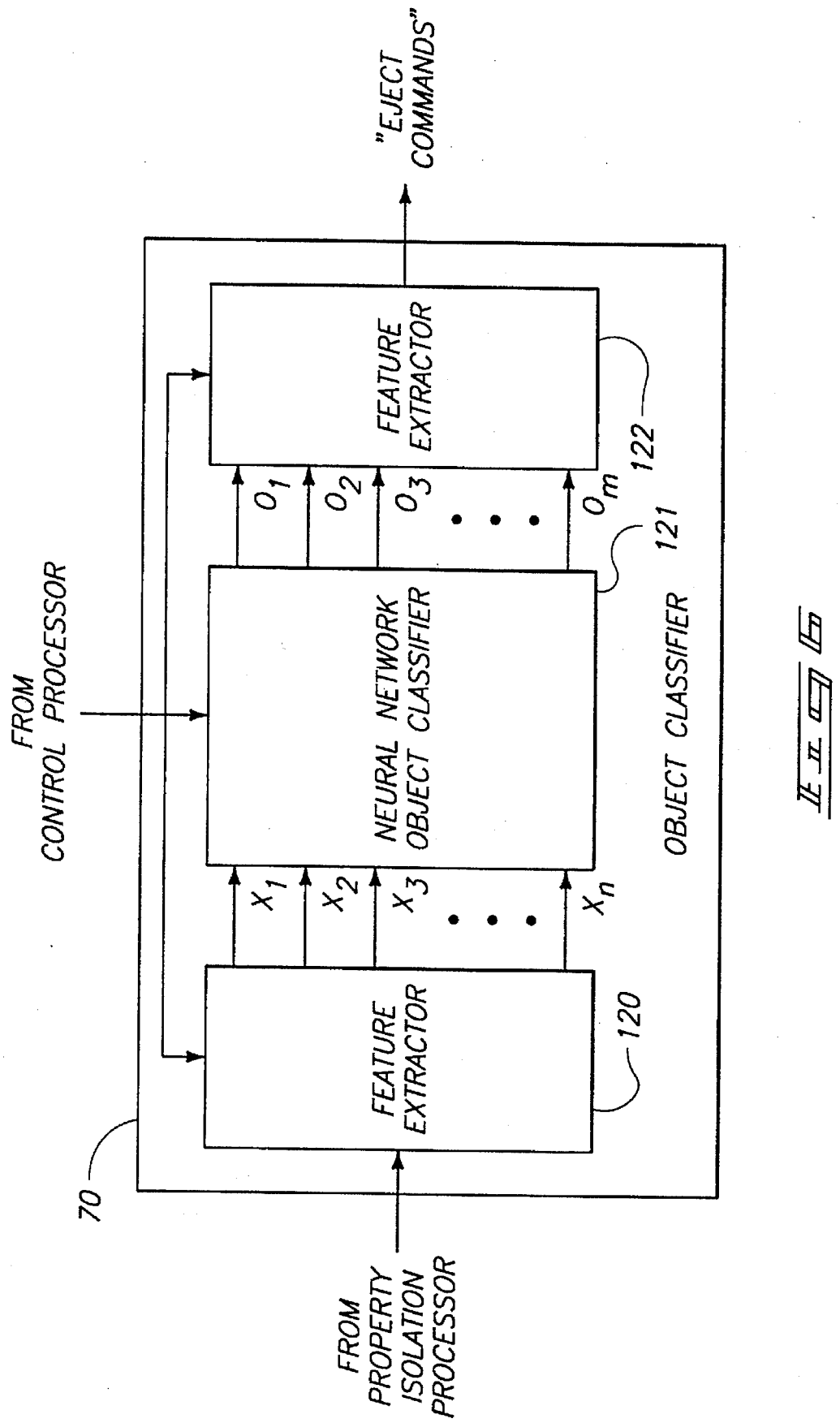
FIG. 6 is a neural network implementation of the object classifier depicted in FIG. 3.

Preferably, the feature extractor of FIG. 6 extracts feature vectors $x_1, x_2, x_3, \ldots x_n$ such as area, length, perimeter, perimeter$^2$/area, etc., descriptive of the object. These are fed to the input layer of neurons of the neural network object classifier 121, a type of multilayer perception. In one embodiment depicted in FIG. 7, the neural network object classifier consists of a three layer, backpropagation network, with the input layer, $x_1$-$x_n$, consisting of one neuron for each of n features, a hidden layer consisting of n neurons, and an output layer consisting of one neuron for each of m output classes, $o_1$-$o_m$, corresponding to the m classes into which each object will be classified. The neurons possess a non-linear, preferably, a sigmoidal activation function. The backpropagation network is an established design wherein the backpropagation of error signals from the output layer is used to adjust the synaptic weights of input and hidden layers. Presentation of a series of sets of input patterns $x_1, x_2, x_3, \ldots x_n$ trigger a forward propagation of signals through the network and results in a set of output values, $o_1, o_2, o_3, \ldots o_m$, corresponding to each of the m possible classes. During learning, the error between the output values $o_1, o_2, o_3, \ldots o_m$ calculated as a result of forward propagation, and the expected values for $o_1, o_2, o_3, \ldots o_m$ is backpropagated through the network to adjust synaptic weights on the neurons in such a way that, as the training series of input patterns is presented to the network, the synaptic weights converge to stable values that result in correct classification of input values $x_1, x_2, x_3, \ldots x_n$ presented to the input layer, and thus minimization of the error backpropagated through the network. Backpropagation networks are well established, and some are available in commercial form, as hardware, software, or hardware/software hybrids such as the NeuralWorks™ Professional II/Plus from NeuralWare of Pittsburgh, Pa. An important benefit of backpropagation networks is their ability to generalize: they do not have to be presented with every possible input pattern during the training of the neural net.

In application pack support of the neural network object classifier 121, the application pack supplies the neural network extent, the number of layers and number of neurons, and the synaptic weights based on training. Thus, it benefits by previous "training" and is immediately able to provide sophisticated object classification.

The eject processor 122 of FIG. 6 assesses the outputs $o_1, o_2, o_3, \ldots o_m$ to determine whether or not to activate the ejection mechanism. In one embodiment, the object would be classified according to which output value has the highest value. If that class is intended to be separated from the product stream, the eject processor generates a corresponding eject command.

Another implementation of the application pack uses a backpropagation neural network for control of the image sorting engine, distinct from, but possibly in addition to, using a neural network for the object classifier. In this manner, the neural network is implemented as a control processor.

As shown in FIG. 6, the object classifier 70 of FIG. 3 has been constructed with the feature extractor 120, the neural network object classifier 121 and the eject processor 122. In this implementation, object features are listed as $x_1$-$x_n$, wherein $x_1$ is area, $x_2$ is length of a thin section, $x_3$ is a ratio of major versus minor axes, and $x_n$ is a ratio of (perimeter) squared/area. Similarly, output values are indicated as follows: $o_1$ indicates good product, $o_2$ indicates rotted product, $o_3$ indicates stem product and $o_m$ indicates a foreign object. As implemented in FIG. 6, the feature extractor 120 extracts feature measurements $x_1$-$x_n$. The neural network 121 performs separation in n-tuple yielding output values $o_1$-$o_m$. The eject processor 122 evaluates $o_1$-$o_m$ in order to test for a reject condition based on "best" classification into output values $o_1$-$o_m$. For example, a highest value, a lowest value, or boolean patterns. Finally, weighting values for the nodes as well as the neural network object classifier, preferably configured as shown in FIG. 7, are supplied as part of the application pack, and are configured for a given product being sorted.

Preferably, all application packs use one or more sliders. Each slider "maps" various positions of one or more movable boundaries in feature vector space against the linear position of the slider. For many useful separations, this mapping can be complex and non-linear. In this embodiment of a neural network control processor, this mapping is "learned" by the neural network in a manner similar to the above-described neural network object processor, as part of the application pack configuration. In this case, the output values $o_1, o_2, o_3, \ldots o_m$, rather than corresponding to object classes, consist of control values used to set various parameters of the image sorting engine, which may include inputs to the input layer of a neural network object classifier. That is, the network is trained to generate the correct output pattern of control signals to the image sorting engine for a given input pattern of slider values. The benefit here is that very complex mappings can be accomplished based on training with real product, eliminating the need for extensive iterative attempts using regression or other statistical techniques, and providing the operator with a ready-to-run application.

Figure 7:
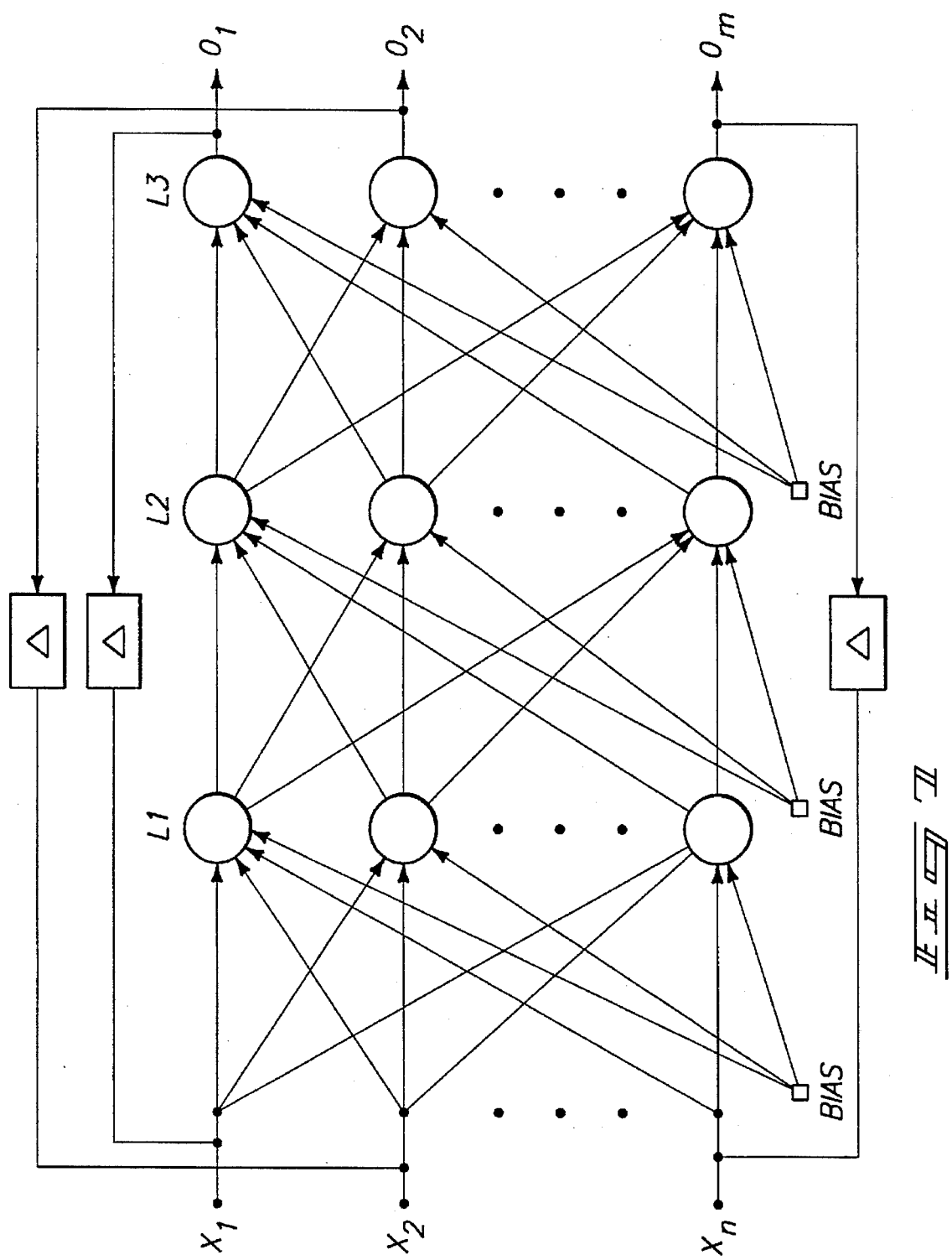
FIG. 7 is an exemplary neural network configured to realize the object classifier of FIG. 6.

Actual physical implementation of devices according to FIGS. 6 and 7 can be as software running in the control processor 26 or as software running in a separate hardware neural network module.

In order to better understand utilization of the application pack with the before-described device, three example sorting applications are hereinafter described covering three levels of sorting complexity; namely, a simple application-pack, intermediate application-pack, and an advanced application-pack.

Simple Application Pack

The sorting engine 54 of FIG. 3 can be configured to sort an exemplary vegetable generally referred to as a "luman" that characteristically has a very uniform orange color. For use in the following examples, a luman is an imaginary vegetable product. Alternative food products suitable for sorting would include legumes, peas, carrots, french fries, corn, peanuts and any other similar product. Lumans are characteristically found to have a single well known type of defect commonly referred to by customers as "rot". The presence of rot in a lureart can be characterized by either black or green spots (or both). For the case where a customer wants to implement sorting apparatus 10 including sorting engine 54 to perform simple sorting operations for lurearis, the customer will typically want to control a single parameter defining the size of the rot pieces, or spots on lureart that the sorter ejects from the stream of good product. The customer may also want to know the percentage of rot pieces detected by the sorter in the incoming product stream over time.

The video display 50 via the graphical user interface 32 will have a single slider 52 that is labeled "ROT". Preferably, the slider has a linear range of sensitivity between a minimum sensitivity level (i.e. no rot pieces are ejected) and a maximum sensitivity level (i.e. lureart pieces are ejected if black and/or green spots of any size are detected). In this application, the slider, implemented in software via the graphical user interface and displayed on display 50, will be tied directly to a "rot area" threshold used by the object processor 60 for classifying lureart pieces as "rot". Additionally, the display 50 of the application pack will preferably have a gauge-type display indicating the percentage of rot-defect pieces detected in the incoming product stream similar to status display 80 of FIG. 8.

In the case of a simple application pack 30 having a single-slider implementation, the color definitions are implemented via processor 26 through implementation of software 36 such that orange, black and green are the only colors of interest when sorting lumans. Therefore, the application-pack will have four pre-established color definitions: orange, black, green and a background. Such color recognition is already known in the art and has been implemented according to the previously referenced patents and patent applications assigned to Key Technology.

With respect to attributes, rot pieces can have either black or green spots. Therefore, a simple application-pack of FIG. 4 will logically combine the black and green color definitions into one attribute called "rot". Furthermore, the resulting application pack will have two other attributes called "background" and "flesh". Therefore, there will be a total of three attributes.

The simple version of the application pack will have a single "rot area" threshold. This threshold will be used by the object classifier 70 to compare against areas of rot spots that are computed from the property isolation processor 68. Preferably, the application pack will provide (via a slider 52) direct control of the rot area threshold to an operator.

In operation, the color classifier 64 will convert the 24-bit RGB camera values into either "background", "flesh", or "rot" by creating corresponding binary images for each attribute. For this pack no properties need be derived by the property isolation processor 68 from the three attributes. Finally, the object classifier 70 classifies product pieces based on analysis of objects detected in the attribute binary images.

With respect to object classifier 70, when implementing the simple application-pack, the labeled results for "rot" will be analyzed by the object classifier for rot "blobs" (i.e. contiguous rot pixels). Preferably, the area of each rot blob will be computed by the object classifier 70. Each rot blob is then registered with a "parent" lureart piece on which it was optically detected. The areas of the rot blobs are then compared against a "rot area" threshold, set by an operator with a slider 52. All luman pieces having rot blobs larger than the rot area threshold are subsequently classified as defects and are ejected by a product diverter 72 according to one of the previously mentioned sorting devices developed by Key Technology. All other luman pieces are allowed to pass through the sorter unaffected. Preferably, the object classifier 70 also periodically updates the control processor with the number of rot pieces and good pieces it has detected since the last update via feedback 74. The control processor then computes the percentage of rot pieces in the incoming product stream and preferably displays it on the rot gauge contained on display 50. Hence, a simple movement of slider 52 affects sorting machine 54 by changing the rot area threshold in the top-level application pack window 50.

Intermediate Application Pack

FIG. 3 can also be configured with sorting engine 54 incorporating a specific application pack 30 having an intermediate level of sophistication. In addition to controlling the size of rot pieces being ejected by a sorting apparatus 10, the customer may also want to control the size of the rot pieces that the sorter actually classifies as being defective. The increased level and sophistication allows a customer to let a certain amount of defective product pass through the sorter in order to increase overall effective yield for times where a limited amount of defective product is acceptable. For example, certain customers may accept a limited amount of defective product according to their product requirements. In all cases, the total number of pieces that are actually ejected by sorting apparatus 10 will always be less-than or equal-to the number of pieces that are being classified as defective by the sorting engine 54.

For this particular case, it becomes desirable to provide a sorting engine 54 that allows a first-level operator to control which rot defects are actually ejected by adjusting a slider 52, yet will allow a supervisor-type operator to control which rot pieces are classified as defective by adjusting a password-protected slider 52. Preferably, a supervisory-type operator can access the software 36 in order to implement such commands via a software-based and display-accessible security access code. As a result, a first-level operator will be able to adjust rot defects actually ejected, yet will not be able to change the definition of rot defects. Furthermore, the customer may want to know the percentage of rot defects detected by the sorter in the incoming product stream over time as well as the percentage of rot defects that are actually ejected.

Preferably, the touch-pad display 50 will have a single slider 52 labeled "Rot" having an adjustable range from a minimum sensitivity level (i.e. no rot pieces are ejected) and a maximum sensitivity level (i.e. lureart pieces are ejected if black or green spots of any size are detected). In this example, slider 52 will be tied directly to a "rot-eject area"

threshold used by the object processor 70 to select which rot defects to eject. Additionally, window portion 51 of touchpad display 50 will have a gauge-type similar to displays 80–83 of FIGS. 8 and 11 indicating the percentage of rot defects detected in the incoming product stream as well as a gauge-type display indicating the percentage of rot defects in the incoming product stream that are actually ejected by the sorter.

An intermediate level application pack will also have a second-level window within graphical user interface 32 that can be displayed on touch pad display 50 and that has a single slider labeled "MINIMUM ROT SIZE". However, this second-level window is only accessible via a supervisory security access code as discussed above. This limited-access slider will be directly tied to a "rot-defect area" threshold used by the object classifier 70 for classifying luman pieces as "rot". In this implementation, it is important to note several things. First, the "rot-defect area" threshold serves as a lower bound for the "rot-eject area" threshold. Secondly, every rot piece that is ejected will have first been classified as rot defects by the object classifier 70. Finally, every luman piece classified as a rot defect by the object classifier will be ejected if and only if "rot-eject area" threshold equals "rot-defect area" threshold; if "rot-eject area" threshold is greater than "rot-defect area" threshold, then a subset of the luman pieces classified as rot defects by the object classifier will be ejected.

For the case of color definition, the exemplary intermediate application pack has only three colors of interest; namely, orange, black and green. Therefore, the application pack will have four pre-established color definitions: orange, black, green, and background. For the case of attributes, the intermediate application pack, like the simple application pack, will logically combine black and green color definitions into one feature called "rot", because rot pieces in lumans can have either black or green spots. Furthermore, the application pack will have two other attributes called "background" and "flesh" Thus, there will be a total of three attributes. For this pack, no properties need be derived by the property isolation processor 68 from the three attributes.

For this pack no properties need be derived by the property isolation processor 68 from the three attributes.

Thresholds are set by control processor 26 via the application pack 30 similar to the previous example of a simple application pack. As was the case in the simple application pack, a "rot eject area" threshold is provided. This threshold is used by the object classifier 70 to compare the threshold level of "rot-eject area" against rot areas that are computed from objects in the "rot" binary image in order to determine which pieces to eject. Preferably, the application pack will provide (via a slider in touch pad display 50) direct control to the rot-eject area threshold to an operator. The application pack will also have a "rot-defect area" threshold. This threshold will be used by the object processor in order to compare the "rot-defect area" threshold against rot areas that are computed from objects in the "rot" binary image in order to determine which pieces to classify as rot defects. However, the application pack in this case will provide access to a slider 52 in a second-level window which is only accessible to a supervisory operator via a password and security code. Therefore, direct control of the rot-defect area threshold is also available on a slider, but it can only be accessed by a supervisory operator via a security code.

As in the simple application pack, the color classifier 64 of the intermediate level application pack will convert the 24-bit RGB camera values into either "background", "flesh" or "rot" by creating corresponding binary images for each attribute.

With respect to the object classifier 70, the "rot" binary image is analyzed to detect rot "blobs". Classifier 70 then computes the area of each detected rot blob. Each rot blob is then registered, or mapped with its respective "parent" luman piece. Subsequently, the areas of the rot blobs are compared against the rot-eject and rot-defect area thresholds. All luman pieces having rot blobs larger than the rot-defect area threshold are classified as rot defects. Furthermore, all luman pieces having rot blobs larger than the rot-eject area threshold are classified as rot defects and are ejected by the product diverter 72. All other luman pieces are subsequently allowed to pass through.

In operation, the object classifier 70 periodically updates the control processor 26 with the number of rot pieces it has detected in the incoming product stream, the number of pieces it has actually ejected, as well as the number of good pieces it has detected since the last update. The control processor 26 furthermore computes the percentage of rot pieces in the incoming product stream and the percentage of the rot pieces that have been ejected, and furthermore displays these values on corresponding gauges that can be displayed on touch pad display 50 via selection of an appropriate display through graphical user interface 32. In summary, the rot-eject area threshold is tied directly to a slider 52 in the top-level application pack accessible by an operator. The rot-defect area threshold is tied directly to a corresponding slider 52 only accessible in a second-level graphical user interface window by a supervisory operator.

Advanced Application Pack

FIG. 3 can also be configured as an advanced level application pack 30 having a higher level of complexity. In an exemplary advanced application pack, the customer may want to control the size of rot pieces that the sorter ejects, as well as the size of rot pieces that the sorter actually classifies as a defect, similar to what was done in the intermediate application pack. In the advanced case, the number of pieces that are actually ejected will always be less-then or equal-to the number of pieces that are classified as a defect. In this case, the customer wants only a supervisor-type of operator to adjust the threshold that defines what pieces are rot defects and wants a simpler operator who actually operates the apparatus 10 during sorting to adjust the maximum allowed percentage of rot in the accepted stream. Furthermore, the customer wants to know the percentage of rot defects detected by the sorter in the incoming product stream over time, the percentage of rot defects that are actually ejected, as well as the percentage of rot defects in the accept (or acceptable) stream of product.

Further features desired by a customer in the advanced application pack including the ability to eject luman pieces having long stems, while allowing shorter stems to pass through the sorter without being diverted. Typically luman stems are characteristically thin when compared with the actual lureart piece. The customer may want to control the length of the stem that the sorter ejects, as well as the length of the stems that the sorter actually classifies as a stem. In this case, the number of pieces that are actually ejected because of stem length will always be less-then or equal-to the number of pieces that are classified as having a stem. Again, the customer may want only a supervisor-type operator to adjust the threshold that defines how long a "thin" luman piece has to be before it is classified as a stem, and the customer may want a operator with less responsibility of authority to adjust the maximum allowed percentage of pieces with stems delivered in the accepted stream. The customer furthermore wants to know the percentage of pieces with stems detected by the sorter in the incoming product stream over time, the percentage of these stem defects that are ejected, and the percentage of pieces with stems in the accept stream.

The touch pad display 50 of the application pack 30 will preferably have a slider labeled "ROT PERCENTAGE ALLOWED" which will specify to the sorting apparatus 10 the maximum allowable percentage of rot pieces in the accept stream. The slider 52 will be tied directly to the target value of a statistical process control algorithm executed on the control processor 26 and receiving feedback on classification via feedback loop 74 as shown in FIG. 3. Many different forms of statistical process control algorithms are presently readily commercially available. The algorithm will preferably continuously update a "rot-eject area" threshold used by the object classifier 70 for selecting which rot defects to eject. Additionally, the touch-pad display 50 of the application pack will have a gauge-type display similar to displays 80–83 in FIGS. 8 and 11 indicating the percentage of rot defects detected in the incoming product stream, a gauge-type display indicating the percentage of rot defects in the incoming product stream that are actually ejected by the sorter, and a gauge-type display indicating the percentage of rot pieces in the accept product stream.

The touch-pad display 50 of the application pack 30 will also have a slider 52 labeled "stem percentage allowed" which will specify to the sorter 10 the maximum allowable percentage of pieces with stems in the accept stream. This slider will be tied directly to the target value of a statistical process control algorithm executing on control processor 26. This algorithm will continuously update a "stem-eject length" threshold used by the object processor for selecting which stem defects to eject. Additionally, the touch-pad display 50 of the application will have a gauge-type display indicating the percentage of stem defects detected in the incoming product stream, a gauge-type display indicating the percentage of stem defects in the incoming product stream that are actually ejected by the sorter, and a gauge-type display indicating the percentage of stem pieces in the accept product stream. Alternatively, each of the displays can be brought up individually, or in combination via reconfiguration of screens with the graphical user interface 32.

As was the case for the intermediate complexity application pack, the advanced application pack 30 of FIG. 6 will also have a second-level window (accessible only via a supervisory security code password) which has a slider 52 labeled "MINIMUM ROT SIZE". This slider will be directly tied to a "rot-defect area" threshold used by the object classifier 70 for classifying luman pieces as "rot".

Several important features are worth noting here: First, the "rot area defect" threshold will serve as a lower bound for the "rot area eject" threshold. Secondly, all rot pieces ejected will have first been classified as rot defects by the object classifier 70. Finally, all luman pieces classified as rot defects by the object classifier 70 will be ejected if and only if "rot area eject" threshold equals "rot area defect" threshold. If the "rot area eject" threshold is greater than "rot area defect" threshold, then a subset of the luman pieces classified as rot defects by the object classifier 70 will be ejected.

Preferably, a third slider 52 will also be provided in the sorting engine 54 of the advanced application pack. Namely, a slider 52 labeled "MINIMUM STEM SIZE" will also be provided in the second-level window. This slider will be directly tied to a "stem-defect length" threshold used by the object classifier 70 for classifying luman pieces as "stem pieces" (i.e. pieces with stems). With respect to color definition, the sorting engine 54 in the advanced application pack 30 will distinguish orange, black and green, which are the only colors of interest in this example. Therefore, the application pack has four-established color definitions: Orange, black, green and background.

The attributes depicted in the advanced application pack are the same as those depicted in the simple example. Specifically, because rot pieces can have either black or green spots, the application pack will logically combine the black and green color definitions into a single attribute called "rot". Furthermore, the application pack has two other attributes called "background" and "flesh". Hence, there will be a total of three attributes in this application pack.

Additionally, the application pack will have a pre-set sequence of morphological operations that it uses to initialize the property isolation processor 68 for isolating stem properties. The property isolation processor 68 will then create a binary image containing only those pixels on the "thin" areas of objects in the "background" binary image. Stems isolated by processor 68 will later be "registered" along with defective rot spots with "parent" luman pieces, by object classifier 70. Furthermore, the centers of the defective luman pieces will then be computed so that ejection air-blasts can be aimed at the actual luman piece centers from the product diverter 72.

The threshold criteria for the sorting engine 54 in the exemplary advanced application pack follows similar to that for the simple application pack. The application pack 30 will have a "rot-eject area" threshold. However, the operator will not have direct control over threshold via the slider 52. In this case, the rot-eject threshold will still be used by the object classifier 70 to compare against rot areas in the "rot" binary image in order to determine which pieces to eject. However, the application pack will automatically and continuously internally adjust the rot-eject area threshold as part of an internally integrated statistical process control algorithm 76 implemented by control processor 26 via feedback 74 which uses a target percentage (of allowable rot in the accept stream) as specified by an operator via a slider 52. Additionally, the application pack will have a "rot-defect area" threshold. This threshold will be used by the object classifier to compare against rot areas that are computed from the "rot" binary image in order to determine which pieces to classify as rot defects. A slider 52 will be provided for this threshold in the application pack in a second-level window accessible to a supervisory operator via a password security code. In this manner, a supervisory operator can have direct control of the rot-defect area threshold.

Another threshold provided in the sorting engine 54 for the advanced application pack consists of a "stem-eject length" threshold. However, the operator will not have direct control over this threshold via a slider. The stem-eject threshold will still be used by the object classifier 70 to compare against stem lengths that are computed from the stem binary image in order to determine which pieces to eject. However, the application pack itself will automatically continuously adjust the stem-eject length threshold as part of a statistical process control algorithm either similar to or the same as algorithm 74 which uses a target percentage (of allowable stemmed pieces in the accept stream) specified by an operator via a slider 52. The application pack will also have a "stem-defect length" threshold. The aforementioned threshold will be used by the object classifier 70 to compare against stem lengths that it computes from the stem binary image in order to determine which pieces to classify as stem defects. As was the case for the rot-eject area threshold, the application pack 30 will preferably provide a slider 52 in its second-level window accessible by a supervisory operator in order to directly control the stem-defect length threshold.

In operation, the color classifier of FIG. 3 will convert the 24-bit RGB camera values 56 into either "background", "flesh", or "rot" by creating corresponding binary images for each attribute.

Property isolation processor 68 isolates into a stem binary image the thin parts of the objects in the background binary image, and the isolated results are passed onto the object classifier 70.

The object classifier 70 of FIG. 3 analyzes the "rot" binary image in order to detect rot "blobs". The object classifier then computes the area of each detected rot blob. The rot blobs are then registered with their "parent" luman pieces. The areas of the rot blobs are then compared against the rot-eject as well as the rot-defect area thresholds. All luman pieces having rot blobs larger than the rot-defect area threshold are classified as rot defects. All luman pieces having rot blobs larger than the rot-eject area threshold are classified as rot defects and are ejected by the product diverter 72. All other luman pieces are allowed to pass through as acceptable product during a sorting operation.

Preferably, the object classifier 70 periodically updates the control processor 26 with the number of rot pieces that have been detected in the incoming product stream, the number of rot pieces that have actually been ejected, and the number of good pieces that have been detected since the last update. Preferably, the controlled processor 26 then computes the percentage of rot pieces in the incoming product stream and the percentage of rot pieces that have been ejected, afterwhich the respective values are displayed on corresponding gauges preferably accessible through the graphical user interface 32 for display on touch pad display 50. In summary, the control processor in this embodiment uses computed percentages in a statistical process control algorithm 76 to figure out the continuous adjustment to the rot-eject area threshold. Additionally, the rot-defect area threshold is manipulated directly by a dedicated slider 52 in a second-level application pack window accessible only by a supervisory operator, for example by coded activation of one or more of buttons 78.

Furthermore, the stem binary image is also analyzed by object classifier 70 for "stem blobs" by the object classifier 70. The object classifier then computes the length of each detected stem blob. Stem blobs are then registered with their "parent" luman pieces. Next, the length of each stem blob is then compared against both the stem-eject as well as the stem-defect length thresholds. All luman pieces having stems longer than the stem-defect length of threshold are then classified as stem defects. All luman pieces with stems longer then the stem-eject area threshold are classified as stem defects and are subsequently ejected. All remaining luman pieces are allowed to pass through the sorting apparatus 10.

Preferably, the object classifier 70 periodically updates the control processor 26 with the number of stem pieces that have been detected in the incoming product stream, the number of stem pieces that have actually been ejected, and the number of good pieces that have been detected since the last update. The control processor 26 then preferably computes the percentage of stem pieces in the incoming product stream and the percentage of stem pieces that have been ejected, and furthermore, displays these values on corresponding gauges similar to displays 80–83 of FIGS. 8 and 11 implemented via the graphical user interface 32 on touch pad display 50. In summary, the control processor 26 uses the computed percentages in a statistical process control algorithm in order to figure out how to continuously adjust the stem-eject length threshold. Additionally, the stem-defect length threshold is tied directly to a dedicated slider 52 in the second-level application pack window accessible only by a supervisory operator.

The general sorting system including the sorting engine 54 provided in part by application pack 30 has readily adaptable and easily utilized capabilities such that use by a simple operator is readily performed on the device generally depicted in FIG. 3. Yet, with the three example application packs discussed above, this general sorting system can be "packaged" in a manner which appears to a customer like an easy-to-use sorter designed specifically for the customer and the customer's particular product sorting operation. This feature, in combination with the ease of use that the application pack 30 will provide a customer by hiding unnecessary machine complexities to a simple user, constitutes the main contribution of the apparatus and method of this invention.

Figure 8:
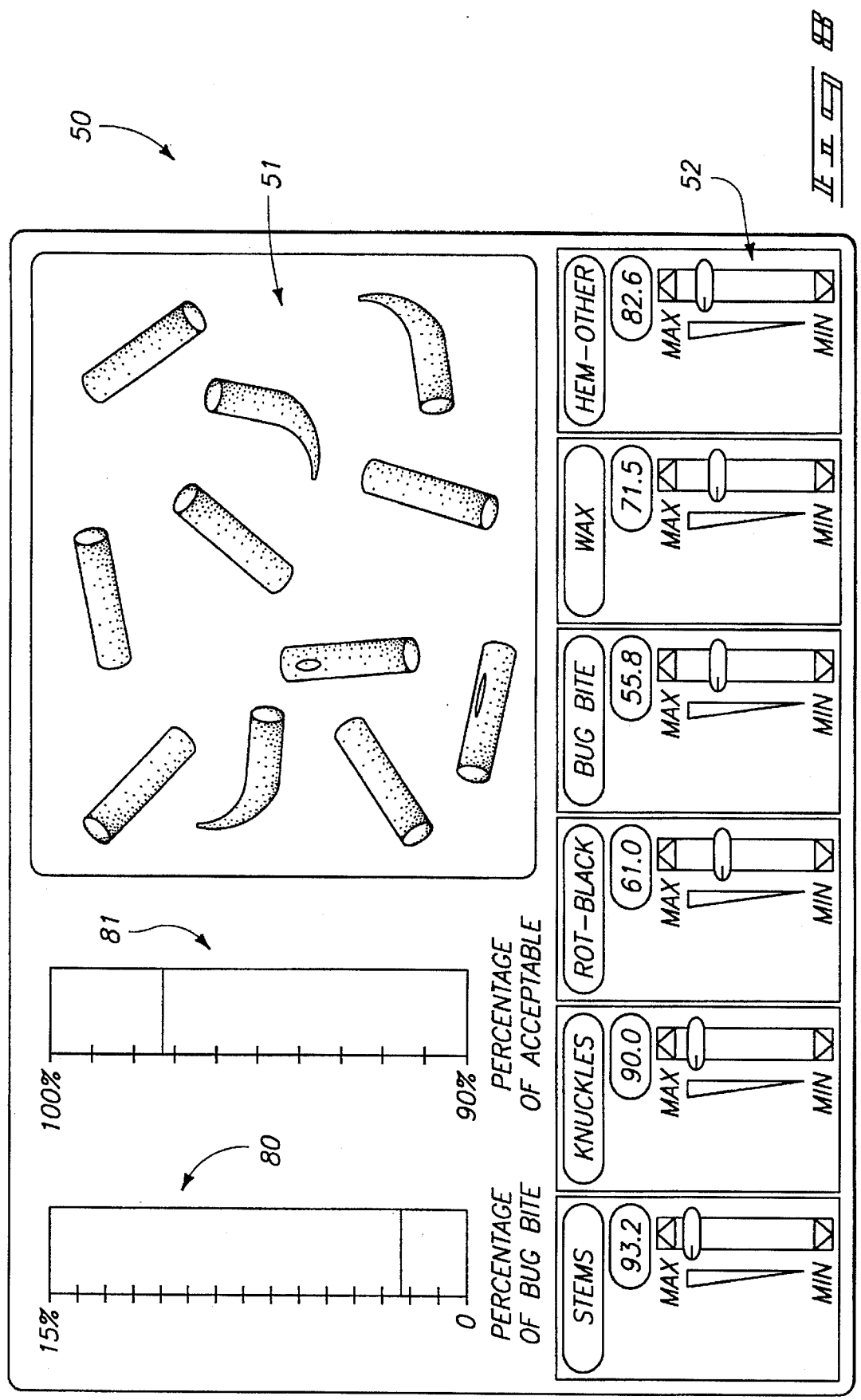

FIGS. 8–11 depict various exemplary touch pad screen displays 50 with a graphical user interface of this invention. FIG. 8 depicts display 50 configured for sorting beans. FIGS. 9 and 10 depict screen display 50 for sorting defects in french fries. Additionally, FIG. 11 depicts screen display 50 configured for sorting carrots.

We claim:

1. A high speed mass flow food sorting apparatus for optically inspecting and sorting non-uniform bulk food articles, the apparatus comprising:

means for moving laterally distributed bulk food articles in a high velocity mass flow past an inspection station to a mass flow sorting station;

an electro-optical imaging device at the mass flow optical inspection system for generating image signals containing information concerning physical characteristics of individual food items in the mass;

a sorting system at the mass flow sorting station for sorting the individual food items in accordance with selected physical characteristics; and control means operatively connected to the mass flow optical inspection system and the sorting system for identifying individual food articles having differentiable optical characteristics and sorting the differentiable articles from the flow of bulk food articles;

wherein the control means includes a) an operator control console having an operator input device and an operator display which graphically displays at least one adjustable sorting characteristic corresponding to one or more sorting parameters, with the input device configured to operatively adjust at least one sorting parameter, b) a programmable computer having a graphical user interface, the computer connected with the control console and programmed to display the sorting characteristic on the operator display, and c) a program memory provided by the computer and configurable to receive an operator input to the operator control device to adjust the sorting characteristic.

2. The sorting apparatus of claim 1 wherein the sorting characteristic is tied to at least one attribute definition.

3. The sorting apparatus of claim 1 wherein the sorting characteristic is tied to at least one property definition.

4. The sorting apparatus of claim 1 wherein the sorting characteristic is tied to at least one feature.

5. The sorting apparatus of claim 1 wherein the sorting characteristic is tied to at least one feature combination.

6. The sorting apparatus of claim 1 wherein the sorting characteristic is tied to at least one feature threshold.

7. The sorting apparatus of claim 1 wherein the electro-optical imaging device is a color video camera, the image signals are video signals, and the camera is constructed and arranged to generate the video signals.

8. The sorting apparatus of claim 1 wherein the operator control device and the operator display comprise a graphical touch screen display providing operator-adjustable controls.

9. The sorting apparatus of claim 1 wherein the operator control device comprises a slider.

10. The sorting apparatus of claim 8 wherein the touch screen display comprises a graphical slider configured by the graphical user interface so as to display the adjustable sorting characteristic.

11. The sorting apparatus of claim 1 wherein the operator control device comprises a mouse peripheral device.

12. The sorting apparatus of claim 1 wherein the operator control device comprises a light pen peripheral device.

13. The sorting apparatus of claim 1 wherein the operator control device comprises a track-ball peripheral device.

14. The sorting apparatus of claim 1 wherein the operator control device comprises a keyboard peripheral device.

15. A process for customizing a sorting machine by an operator, the process comprising the steps of:

presenting a moving flow of laterally distributed bulk food articles in high velocity flow past an inspection station to a mass flow sorting station;

providing a control system including a programmable computer having a programmable memory, a graphical user interface loaded into the memory, an operator control console, and an operator display;

providing an inspection station operatively connected to the control system, the inspection station including an electro-optical imaging device configured to deliver an imaging signal to the control system; and providing a sorting system operatively connected to the control system, the sorting system including an article sorter configured to sort differentiable food articles in response to control commands from the control system, providing an application pack having at least one sorting parameter implemented in the programmable memory via the control system;

configuring at least one sorting parameter with an adjustable sorting characteristic;

displaying the sorting characteristic to an operator on a display in the form of an adjustable graphical slider; and adjusting the graphical slider so as to change the results of a sort differentiable articles from the flow of bulk articles.

16. The process of claim 15 further comprising the step of providing a touch screen display configured to display at least one graphical slider for presentment to an operator, the graphical slider adjustable by an operator via the display to adjust the respective sorting characteristic during a sort.

17. The process of claim 15 further comprising the step of providing a touch screen display having at least one graphical slider configured for presentment to an operator on the display, the graphical slider adjustable by an operator via the display to adjust the respective sorting characteristic during a sort, the sorting characteristic accessible by an operator via the display.

18. The process of claim 15 wherein the sorting characteristic is automatically controlled by a statistical processing algorithm.

19. The process of claim 15 wherein the sorting characteristic is an attribute.

20. The process of claim 15 wherein the sorting characteristic is a property.

21. The process of claim 15 wherein the sorting characteristic is a feature.

22. The process of claim 15 wherein the sorting characteristic is a feature combination.

23. The process of claim 15 wherein the sorting characteristic is a feature threshold.

24. The process of claim 15 wherein the sorting characteristic is automatically controlled by a neural network.

25. The process of claim 15 wherein adjusting the graphical slider defines slider position, the process further comprising the steps of learning the slider positions with a neural network, for a range of sorting performance in a given sorting application, and implementing the neural network as an object classifier to control sorting characteristics.

26. The process of claim 15 further comprising the steps of providing a neural network to characterize natural product variation; and using the characterized natural product variation to adjust sorting characteristics learned from positional adjustment of the sliders in order to adapt the sorting process to maintain an operator desired performance.

* * * * *

UNITED STATES PATENT AND TRADEMARK OFFICE
CERTIFICATE OF CORRECTION

PATENT NO. : 5,659,624  
DATED : August 19, 1997  
INVENTOR(S) : Fazzari, et al

Page 1 of 2

It is certified that error appears in the above-indentified patent and that said Letters Patent is hereby corrected as shown below:

In column 13, line 19, delete the word "lureart" and insert the word "luman".

In column 13, line 22, delete the word "lureairs" and insert the word "lumans".

In column 13, line 24, delete the word "lureart" and insert the word "luman".

In column 13, line 33, delete the word "lureart" and insert the word "luman".

In column 13, line 38, delete the word "lureart" and insert the word "luman".

In column 14, line 12, delete the word "lureart" and insert the word "luman".

UNITED STATES PATENT AND TRADEMARK OFFICE
CERTIFICATE OF CORRECTION

PATENT NO. : 5,659,624
DATED : August 19, 1997
INVENTOR(S) : Fazzari, et al

It is certified that error appears in the above-indentified patent and that said Letters Patent is hereby corrected as shown below:

In column 14, line 65, delete the word "lureart" and insert the word "luman".

In column 16, line 54, delete the word "lureart" and insert the word "luman".

Signed and Sealed this

Eleventh Day of November, 1997

*Attest:*

BRUCE LEHMAN

*Attesting Officer*     *Commissioner of Patents and Trademarks*